United States Patent
Chen et al.

(10) Patent No.: US 10,654,969 B2
(45) Date of Patent: May 19, 2020

(54) THIN FILM AND METHOD FOR MANUFACTURING THE SAME AND COPPER CLAD LAMINATE

(71) Applicant: INDUSTRIAL TECHNOLOGY RESEARCH INSTITUTE, Hsinchu (TW)

(72) Inventors: Meng-Hsin Chen, Xinpi Township (TW); Chih-Hsiang Lin, Taipei (TW); Jen-Chun Chiu, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 193 days.

(21) Appl. No.: 15/858,424

(22) Filed: Dec. 29, 2017

(65) Prior Publication Data
US 2018/0237582 A1   Aug. 23, 2018

(30) Foreign Application Priority Data
Feb. 23, 2017   (TW) .............................. 106106104 A

(51) Int. Cl.
| | |
|---|---|
| C08G 63/02 | (2006.01) |
| C08J 5/18 | (2006.01) |
| B32B 27/36 | (2006.01) |
| B32B 15/09 | (2006.01) |
| C08G 63/06 | (2006.01) |

(52) U.S. Cl.
CPC .............. *C08G 63/02* (2013.01); *B32B 15/09* (2013.01); *B32B 27/36* (2013.01); *C08G 63/065* (2013.01); *C08J 5/18* (2013.01); *B32B 2307/734* (2013.01); *C08J 2367/00* (2013.01); *C08J 2367/04* (2013.01)

(58) Field of Classification Search
CPC ......... C08G 63/02; C08J 5/18; C08J 2367/00; B32B 2307/734; B32B 27/36; B32B 15/09
USPC ....................................................... 428/458
See application file for complete search history.

(56) References Cited

U.S. PATENT DOCUMENTS

| | | | |
|---|---|---|---|
| 5,306,800 A | 4/1994 | Gupta et al. | |
| 6,861,499 B2 | 3/2005 | Vinciguerra et al. | |
| 7,465,420 B2 | 12/2008 | Yoshikawa et al. | |
| 8,158,243 B2 | 4/2012 | Chan et al. | |
| 8,853,344 B2 | 10/2014 | Kim et al. | |
| 2004/0256599 A1 | 12/2004 | Ueno et al. | |
| 2014/0088285 A1 | 3/2014 | Nair et al. | |

FOREIGN PATENT DOCUMENTS

| | | |
|---|---|---|
| CN | 1162608 A | 10/1997 |
| CN | 1358206 A | 7/2002 |
| CN | 102449062 B | 3/2014 |
| JP | 2016132248 | * 7/2016 |
| TW | 201615413 A | 5/2016 |

OTHER PUBLICATIONS

Translation of JP2016-132248, Jul. 25, 2016. (Year: 2016).*
Frich et al., "Novel High-Temperature Aromatic Copolyester Thermosets: Synthesis, Characterization, and Physical Properties," Macromolecules, vol. 29, No. 24, Sep. 1996 (Abstract published in Advance ACS Abstracts, Oct. 15, 1996), pp. 7734-7739.
Jackson, Jr., "Liquid Crystal Polymers. 5. Liquid Crystalline Polyesters Containing Naphthalene Rings," Macromolecules, vol. 16, No. 7, Jul. 1983, pp. 1027-1033.
Kim et al., "The Degradation Process Observed during Step Annealing of 73/27 HBA/HNA Copolyester," Macromolecules, vol. 32, No. 9, 1999 (Published online Apr. 15, 1999), pp. 2855-2860.
Mather et al., "Thermally crosslinkable thermotropic copolyesters: synthesis, characterization, and processing," Polymer, vol. 38, No. 24, Nov. 24, 1997, pp. 6009-6022.
Reyes-Mayer et al., "SALS, WAXS and mechanical properties of heat-treated thermotropic polymers," Polymers for Advanced Technologies, vol. 24, Jul. 2013 (published online in Wiley Online Library on Aug. 10, 2013), pp. 1029-1039.
Taiwanese Office Action and Search Report issued in Taiwanese Application No. 106106104 dated Aug. 3, 2017.

* cited by examiner

*Primary Examiner* — Hui H Chin
(74) *Attorney, Agent, or Firm* — Birch, Stewart, Kolasch & Birch, LLP

(57) ABSTRACT

A thin film is provided, which includes a polymer formed by reacting (a) p-hydroxybenzoic acid, (b) 6-hydroxy 2-naphthoic acid and (c) branched-monomer. (c) branched-monomer is

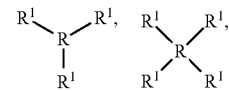

or a combination thereof, wherein R is aryl group, heteroaryl group, or cycloalkyl group, and each of $R^1$ is independently —OH, —NH$_2$, or —COOH. The molar ratio of (a) p-hydroxybenzoic acid over (b) 6-hydroxy 2-naphthoic acid is between 50:50 and 90:10. The molar ratio of (c) branched-monomer over the sum of (a) p-hydroxybenzoic acid and (b) 6-hydroxy 2-naphthoic acid is between 0.25:100 and 0.5:100. The polymer has an intrinsic viscosity of 4 dL/g to 6 dL/g.

14 Claims, 2 Drawing Sheets

THIN FILM AND METHOD FOR MANUFACTURING THE SAME AND COPPER CLAD LAMINATE

CROSS REFERENCE TO RELATED APPLICATIONS

The present application is based on, and claims priority from, Taiwan Application Serial Number 106106104, filed on Feb. 23, 2017, the disclosure of which is hereby incorporated by reference herein in its entirety.

TECHNICAL FIELD

The technical field relates to a thin film and a copper clad laminate.

BACKGROUND

Liquid crystal polymer (LCP) films with properties such as high thermal resistance, low dielectric constant, low dielectric loss, high dimensional stability, low moisture adsorption, flame retardancy, and recyclability may replace the thermosetting polyimide film in the application of flexible boards of next generation. The conventional FCP films have an overly high thermal expansion coefficient, which cannot match a copper foil to form a copper clad laminate. Accordingly, a LCP film with low thermal expansion coefficient for being applied in a copper clad laminate is called-for.

SUMMARY

One embodiment of the disclosure provides a thin film, comprises a polymer formed by reacting (a) p-hydroxybenzoic acid, (b) 6-hydroxy 2-naphthoic acid and (c) branched-monomer, wherein (c) branched-monomer is

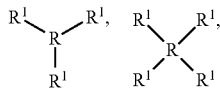

or a combination thereof, wherein R is aryl group, heteroaryl group, or cycloalkyl group, and each of $R^1$ is independently —OH, —NH$_2$, or —COOH; wherein a molar ratio of (a) p-hydroxybenzoic acid over (b) 6-hydroxy 2-naphthoic acid is between 50:50 and 90:10; wherein a molar ratio of (c) branched-monomer over the sum of (a) p-hydroxybenzoic acid and (b) 6-hydroxy 2-naphthoic acid is between 0.25:100 and 0.5:100; and wherein the polymer has an inherent viscosity of 4 dL/g to 6 dL/g.

One embodiment of the disclosure provides a method for manufacturing a thin film, comprising: performing a polymerization of (a) p-hydroxybenzoic acid, (b) 6-hydroxy 2-naphthoic acid, and (c) branched-monomer; melting the polymer to form a thin film; and thermally treating the thin film, wherein (c) branched-monomer is

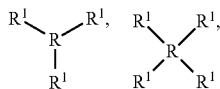

or a combination thereof, wherein R is aryl group, heteroaryl group, or cycloalkyl group, and each of R1 is independently —OH, —NH2, or —COOH; wherein a molar ratio of (a) p-hydroxybenzoic acid over (b) 6-hydroxy 2-naphthoic acid is between 50:50 and 90:10; wherein a molar ratio of (c) branched-monomer over the sum of (a) p-hydroxybenzoic acid and (b) 6-hydroxy 2-naphthoic acid is between 0.25:100 and 0.5:100; and wherein the polymer has an inherent viscosity of 4 dL/g to 6 dL/g.

One embodiment of the disclosure provides a copper clad laminate, comprising a thin film; and a copper foil attached to the thin film, wherein the thin film comprises a polymer formed by reacting (a) p-hydroxybenzoic acid, (b) 6-hydroxy 2-naphthoic acid and (c) branched-monomer, wherein (c) branched-monomer is

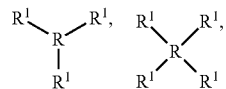

or a combination thereof, wherein R is aryl group, heteroaryl group, or cycloalkyl group, and each of $R^1$ is independently —OH, —NH$_2$, or —COOH; wherein the molar ratio of (a) p-hydroxybenzoic acid over (b) 6-hydroxy 2-naphthoic acid is between 50:50 and 90:10; wherein the molar ratio of (c) branched-monomer over the sum of (a) p-hydroxybenzoic acid and (b) 6-hydroxy 2-naphthoic acid is between 0.25:100 and 0.5:100; and wherein the polymer has an inherent viscosity of 4 dL/g to 6 dL/g.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
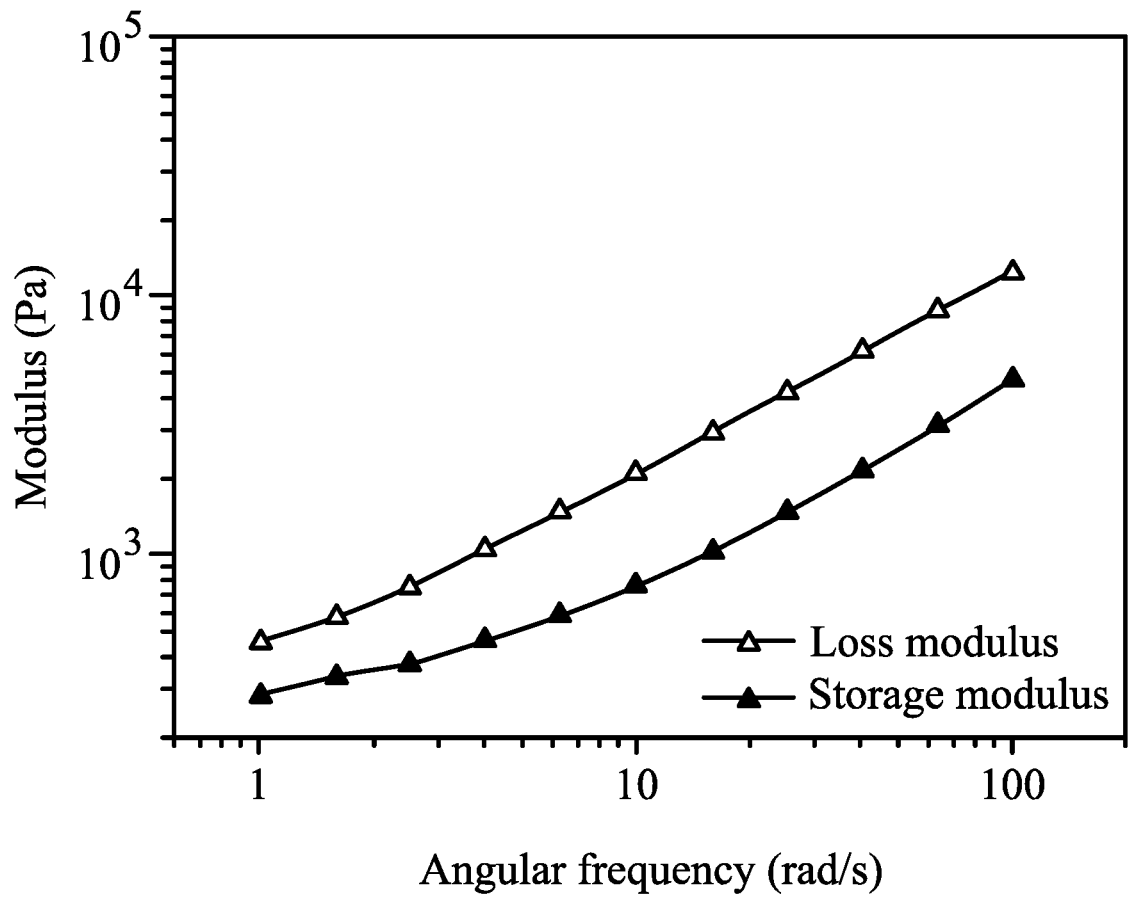
FIG. 1 shows a storage modulus curve and a loss modulus curve of a film in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a thin film including a polymer formed by reacting (a) p-hydroxybenzoic acid (HBA), (b) 6-hydroxy 2-naphthoic acid (HNA) and (c) branched-monomer, wherein (c) branched-monomer is

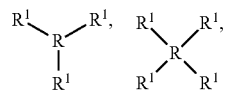

or a combination thereof, in which R is aryl group, heteroaryl group, or cycloalkyl group, and each of $R^1$ is independently —OH, —NH$_2$, or —COOH. In one embodiment, (c) branched-monomer is trimesic acid (TMA). (a) p-hydroxybenzoic acid has a structure of

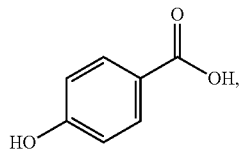

and (b) 6-hydroxy 2-naphthoic acid has a structure of

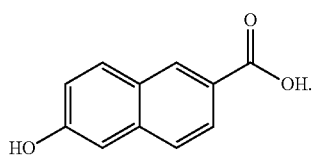 [SMILES: O=C(O)c1ccc2cc(O)ccc2c1]

In one embodiment, the monomers and anhydride compound (e.g. acetic anhydride) can be mixed to perform acetylation (or amidation if R$^1$ is —NH$_2$) and polymerization. In some embodiments, anhydride groups of the anhydride compound and sum of (a) p-hydroxybenzoic acid and (b) 6-hydroxy 2-naphthoic acid have a molar ratio of 80:100 to 120:100. The acetylation can be performed at a temperature of about 150° C. to 180° C. for a period of about 3 hours to 4 hours. The polymerization can be performed at a temperature of about 280° C. to 300° C. for a period of about 1 hour to 2 hours. The monomers may be incompletely acetylated at an overly low acetylation temperature or an overly short acetylation period, such that the polymerization cannot be performed. The monomers may be cracked at an overly high acetylation temperature or an overly long acetylation period, such that the polymerization cannot be performed either. An overly low polymerization temperature or an overly short polymerization period may form a polymer having an overly low molecular weight and insufficient mechanical strength. An overly high polymerization temperature or an overly long polymerization period may yellow and crack the polymer, such that the polymer is off-color and has an insufficient mechanical strength.

In one embodiment, a molar ratio of (a) p-hydroxybenzoic acid over (b) 6-hydroxy 2-naphthoic acid is between 50:50 and 90:10. In another embodiment, the molar ratio of (a) p-hydroxybenzoic acid over (b) 6-hydroxy 2-naphthoic acid is between 60:40 and 80:20. In yet another embodiment, the molar ratio of (a) p-hydroxybenzoic acid over (b) 6-hydroxy 2-naphthoic acid is between 70:30 and 80:20. An overly low ratio of (a) p-hydroxybenzoic acid may form a polymer without a liquid crystal phase, and the polymer has a poor mechanical strength. An overly high ratio of (a) p-hydroxybenzoic acid may form a polymer that easily becomes brittle and has an overly high melting temperature, which cannot be processed. A molar ratio of (c) branched-monomer over the sum of (a) p-hydroxybenzoic acid and (b) 6-hydroxy 2-naphthoic acid is between 0.25:100 and 0.5:100. An overly low ratio of (c) branched-monomer may form a polymer with an insufficient melt strength, which has a poor film formability and low processability. The polymerization will be difficult to perform with an overly high ratio of (c) branched-monomer, such that the polymer has a low polymerization degree and a poor mechanical strength.

In one embodiment, the polymer has an inherent viscosity of about 4 dL/g to 6 dL/g. The polymer having an overly low inherent viscosity is easily brittle and has a poor mechanical strength. The polymer having an overly high inherent viscosity may have a poor flowability, which cannot be easily processed. In some embodiments, the polymerization further includes anhydride compound. The polymer is a low thermally expandable material, which has a thermal expansion coefficient of 30 ppm/° C. to 20 ppm/° C. The polymer can be melted to form a thin film, and the melting temperature can be 100° C. to 160° C. In one embodiment, the thin film may have a thickness of 30 μm to 100 μm based on the requirements. In one embodiment, the thin film can be further thermally treated at a temperature of about 250° C. to 300° C. for a period of about 2 hours to 6 hours. Alternatively, the thin film can be thermally treated at about 250° C. to 280° C. for about 2 hours to 3 hours, and then heated to about 285° C. to 300° C. to be further thermally treated for 2 hours to 3 hours. In yet another embodiment, the thin film can be thermally treated at about 250° C. to 280° C. for about 2 hours, and then heated to about 290° C. to be further thermally treated for 2 hours. In one embodiment, the melting temperature, the elongation ratio, and the breaking strength of the thermally treated thin film are higher than those of the thin film before the thermal treatment. For example, the thermally treated thin film has a melting temperature of about 310 to 400, an elongation ratio of about 13% to 25%, a breaking strength of about 8 kgf/mm$^2$ to 10 kgf/mm$^2$, and a melt strength of 1.4 cN to 1.9 cN. In one embodiment, the thin film may serve as a plate material in a flexible printed circuit (FPC) of high frequency (e.g. copper clad laminate) due to its low thermal expansion, high melt strength, high melting temperature, high elongation ratio, and high breaking strength.

One embodiment of the disclosure provides a copper clad laminate, comprising a thin film; and a copper foil attached to the thin film, wherein the thin film comprises a polymer formed by reacting (a) p-hydroxybenzoic acid, (b) 6-hydroxy 2-naphthoic acid and (c) branched-monomer, wherein (c) branched-monomer is

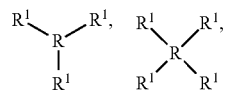

or a combination thereof, wherein R is aryl group, heteroaryl group, or cycloalkyl group, and each of R$^1$ is independently —OH, —NH$_2$, or —COOH; wherein the molar ratio of (a) p-hydroxybenzoic acid over (b) 6-hydroxy 2-naphthoic acid is between 50:50 and 90:10; wherein the molar ratio of (c) branched-monomer over the sum of (a) p-hydroxybenzoic acid and (b) 6-hydroxy 2-naphthoic acid is between 0.25:100 and 0.5:100; and wherein the polymer has an inherent viscosity of 4 dL/g to 6 dL/g.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

73 parts by mole of (a) p-hydroxybenzoic acid, 27 parts by mole of (b) 6-hydroxy 2-naphthoic acid, and 120 parts by mole of acetic anhydride were mixed, heated to 150° C. and reacted at 150° C. for 3.5 hours to perform acetylation. Thereafter, the reaction was vacuumed and further heated to 300° C. and reacted at 300° C. to perform polymerization until the twisting force of the stirring blade motor achieved 220 w. Subsequently, the melted reaction product was extruded into cold water by nitrogen for cooling and cutting granulation to obtain a product. The product was dissolved in 3,5-bis-trifluromethyl phenol, and then slightly stirred by a stirring motor (115V.50/60CY, 1.2 A, 1550 RPM), and then analyzed by Ostwald viscometer to measure its inherent viscosity, as shown in Table 1. The product was analyzed by differential scanning calorimeter (DSC) to measure its melting temperature (Tm), as shown in Table 1.

The product was heated to 140° C. at vacuum to be dried for 8 hours, and then melted to form a thin film with a thickness of about 70 μm, thereby determining the film formability of the product as shown in Table 2. The thermal expansion coefficient of the thin film was measured by thermal mechanical analyzer (DMA-7e, commercially available from PerkinElmer), as shown in Table 2. The Elongation and breaking strength of the thin film were measured by universal testing machine (4505, commercially available from Instron), as shown in Table 3. The melt strength of the thin film was measured by polymer melt strength tester (Rheotens, commercially available from Gottfert), as shown in Table 3.

In addition, the rheology of the thin film was measured by polymer elongation and dynamic viscoelasticity analyzer (MARS III, commercially available from Thermo), as shown in FIG. 1. In FIG. 1, the loss modulus (G") of the thin film is greater than the storage modulus (G') of the thin film. The rheology manner of the thin film was a liquid state. In addition, the thin film had low melt strength. Accordingly, the thin film had poor processability.

In addition, the thin film was thermally treated at 280° C. for 2 hours, and then heated to 290° C. to be further thermally treated at 290° C. for 2 hours. The Tm of the thermally treated thin film was measured, as shown in Table 1.

Example 1

Example 1 was similar to Comparative Example 1, with the difference being that the monomers in Example 1 further included 0.25 mol % of the TMA. The other reaction factors and methods of measurements in Example 1 were similar to those in Comparative Example 1. The results of the measurements are shown in Tables 1 to 3.

Figure 2:
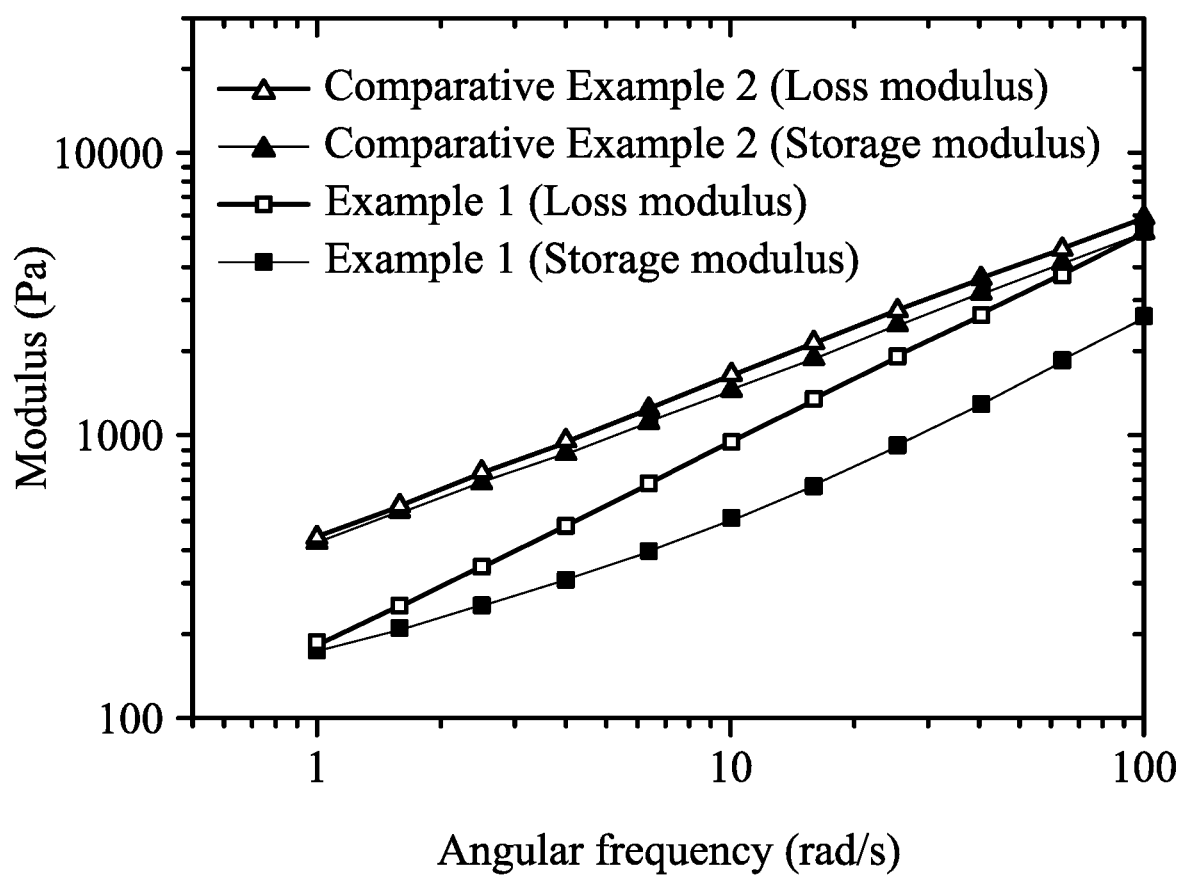
FIG. 2 shows storage modulus curves and loss modulus curves of different films in embodiments of the disclosure.

In addition, the rheology of the thin film was measured by polymer elongation and dynamic viscoelasticity analyzer (MARS III, commercially available from Thermo), as shown in FIG. 2. In FIGS. 1 and 2, the loss modulus (G") and the storage modulus (G') of the thin film in Example 1 are lower than those of the thin film in Comparative Example 1. The rheology manner of the thin film in Example 1 was a viscoelastic behavior. In addition, the thin film in Example 1 had higher melt strength than the thin film in Comparative Example 1. Accordingly, the thin film in Example 1 was beneficial to be processed.

Example 2

Example 2 was similar to Comparative Example 1, with the difference being that the monomers in Example 2 further included 0.5 mol % of the TMA. The other reaction factors and methods of measurements in Example 2 were similar to those in Comparative Example 1. The results of the measurements are shown in Tables 1 to 3.

Not only the Tm, but also the elongation ratio and the breaking strength of the thermally treated thin film were measured. The elongation ratio of the thermally treated thin film was 14.93%, relatively increasing 37.6% compared to that of the thin film without the thermal treatment. The breaking strength of the thermally treated thin film was 8.85 kgf/mm$^2$, relatively increasing 29% compared to that of the thin film without the thermal treatment.

Comparative Example 2

Comparative Example 2 was similar to Comparative Example 1, with the difference being that the monomers in Comparative Example 2 further included 0.75 mol % of the TMA. The other reaction factors and methods of measurements in Comparative Example 2 were similar to those in Comparative Example 1. The results of the measurements are shown in Tables 1 to 3.

In addition, the rheology of the thin film was measured by polymer elongation and dynamic viscoelasticity analyzer (MARS III, commercially available from Thermo), as shown in FIG. 2. In FIGS. 1 and 2, the loss modulus (G") and the storage modulus (G') of the thin film in Comparative Example 2 are similar to those of the thin film in Comparative Example 1. The rheology manner of the thin film in Example 2 was a liquid state. In addition, the melt strength of the thin film in Comparative Example 2 was too low to be measured. Accordingly, the thin film in Comparative Example 2 had poor processability.

Comparative Example 3

Comparative Example 3 was similar to Comparative Example 1, with the difference being that the monomers in Comparative Example 3 further included 1 mol % of the TMA. The other reaction factors and methods of measurements in Comparative Example 3 were similar to those in Comparative Example 1. The results of the measurements are shown in Tables 1 to 3. However, the melt strength of the thin film in Comparative Example 3 was too low to be measured. Accordingly, the thin film in Comparative Example 3 had poor processability.

Comparative Example 4

Comparative Example 4 was similar to Comparative Example 1, with the difference being that the monomers in Comparative Example 4 further included 3 mol % of the TMA. The other reaction factors and methods of measurements in Comparative Example 4 were similar to those in Comparative Example 1. The results of the measurements are shown in Tables 1 to 3. However, the product in Comparative Example 4 had poor film formability, such that the film properties in Comparative Example 4 were not measured.

Comparative Example 5

Comparative Example 5 was similar to Comparative Example 1, with the difference being that the monomers in Comparative Example 5 further included 5 mol % of the TMA. The other reaction factors and methods of measurements in Comparative Example 5 were similar to those in Comparative Example 1. The results of the measurements are shown in Tables 1 to 3. However, the product in Comparative Example 5 had poor film formability, such that the film properties in Comparative Example 5 were not measured.

As shown in Table 3, the thin films formed from monomers including 0.25 mol % to 0.5 mol % of TMA had a higher elongation ratio, breaking strength, and melt strength. In addition, the thermally treated thin films had a higher melting temperature, elongation ratio, and breaking strength than those of the thin films before the thermal treatment, which were beneficial to the film processes.

TABLE 1

|  | HBA/HNA | TMA (mol %) | Intrinsic Viscosity (dL/g) | Tm (° C.) | Tm of the thin film after thermal treatment (° C.) |
| --- | --- | --- | --- | --- | --- |
| Comparative Example 1 | 73/27 | 0 | 5.53 | 283.2 | 310.1 |
| Example 1 |  | 0.25 | 5.20 | 284.4 | 314.2 |
| Example 2 |  | 0.5 | 5.43 | 283.4 | ≥400 |
| Comparative Example 2 |  | 0.75 | 4.60 | 280.4 | ≥400 |
| Comparative Example 3 |  | 1 | 4.05 | 281.3 | ≥400 |
| Comparative Example 4 |  | 3 | 3.58 | 270.1 | Not measured |
| Comparative Example 5 |  | 5 | 2.08 | 261.5 | Not measured |

TABLE 2

|  | HBA/HNA | TMA (mol %) | Film formability | Film processability | Thermal expansion coefficient (ppm/° C.) |
| --- | --- | --- | --- | --- | --- |
| Comparative Example 1 | 73/27 | 0 | Excellent | Poor | 39.14 |
| Example 1 |  | 0.25 | Very excellent | Excellent | 29.05 |
| Example 2 |  | 0.5 | Very excellent | Excellent | 27.63 |
| Comparative Example 2 |  | 0.75 | Excellent | Poor | 24.8 |
| Comparative Example 3 |  | 1 | Excellent | Poor | 23.14 |
| Comparative Example 4 |  | 3 | Poor | Could not be measured | Not measured |
| Comparative Example 5 |  | 5 | Poor | Could not be measured | Not measured |

TABLE 3

|  | HBA/HNA | TMA (mol %) | Elongation ratio before thermal treatment (%) | Breaking strength before thermal treatment (kgf/mm$^2$) | Melt strength (cN) |
| --- | --- | --- | --- | --- | --- |
| Comparative Example 1 | 73/27 | 0 | 4.56 | 3.42 | 1.2 |
| Example 1 |  | 0.25 | 17.03 | 7.44 | 1.4 |
| Example 2 |  | 0.5 | 10.85 | 6.86 | 1.9 |
| Comparative Example 2 |  | 0.75 | 3.38 | 3.29 | Could not be measured |
| Comparative Example 3 |  | 1 | 2.45 | 2.86 | Could not be measured |
| Comparative Example 4 |  | 3 | Not measured | Not measured | Could not be measured |
| Comparative Example 5 |  | 5 | Not measured | Not measured | Could not be measured |

In Table 2, the definition of the very excellent film formability is that the film with high toughness can be bent for several times after the film formation. The definition of the excellent film formability is that the film can be bent for only one time (it will be broken if bent for more times) after the film formation. The definition of the poor film formability is that the film easily becomes brittle and cannot be bent after the film formation. Note that some thin films had excellent film formability, but poor film processability due to their insufficient melt strength.

Example 3

The thin film of Example 1 and the copper foil HA (commercially available from Nikko Metals Taiwan Co., Ltd.) were laminated to form a copper clad laminate. The copper clad laminate was heated at 340° C. for 10 seconds to test its resistance to solder heat, and no bloom phenomenon occurred.

Comparative Example 6

The thin film of Comparative Example 2 and the copper foil HA (commercially available from Nikko Metals Taiwan Co., Ltd.) were laminated to form a copper clad laminate. The copper clad laminate was heated at 340° C. for 10 seconds to test its resistance to solder heat, and the bloom phenomenon occurred.

Comparative Example 7

The commercially available thin film Vectra® A950 and the copper foil HA (commercially available from Nikko Metals Taiwan Co., Ltd.) were laminated to form a copper clad laminate. The copper clad laminate was heated at 340° C. for 10 seconds to test its resistance to solder heat, and the bloom phenomenon occurred.

Accordingly, the thin film of Example 1 with a higher elongation ratio, higher breaking strength, and lower thermal expansion coefficient was suitable to be used in the copper clad laminate.

Example 4

The polymers in Comparative Example 1, Example 1, and Example 2 were respectively melted to form thin films. The thin films had a thickness of 50 μm and a thickness of 100 mm. The dielectric constants and the dielectric loss of the thin films at a measuring frequency of 10 GHz were measured utilizing the standard IPC TM-650 2.5.5.13.

The LCP thin films CT-Z and CT-F were commercially available from Kuraray Company. The thin films CT-Z and CT-F had a thickness of 50 μm and a thickness of 100 mm. The dielectric constants and the dielectric loss of the thin films CT-Z and CT-F at a measuring frequency of 10 GHz were measured utilizing the standard IPC TM-650 2.5.5.13.

In addition, the thin film formed by melting the polymer of Example 2 was further thermally treated (e.g. thermally treated at 280° C. for 2 hours and then thermally treated at 290° C. for 2 hours.). The dielectric constants and the dielectric loss of the thermally treated thin film at a measuring frequency of 10 GHz were measured utilizing the standard IPC TM-650 2.5.5.13. The properties of the thin films are tabulated in Table 4.

TABLE 4

| Thin film composition | Dielectric constant | Dielectric loss |
|---|---|---|
| Kuraray CT-Z thin film | 3.33 | 0.00285 |
| Kuraray CT-F thin film | 3.35 | 0.00320 |
| Polymer of Comparative Example 1 (TMA 0%) | 3.32 | 0.00204 |
| Polymer of Example 1 (TMA 0.25 mol %) | 3.30 | 0.00182 |
| Polymer of Example 2 (TMA 0.5 mol %) | 3.33 | 0.00141 |
| Polymer of Example 2 (TMA 0.5 mol %) (After thermal treatment) | 3.33 | 0.00140 |

As shown in Table 4, addition of an appropriate amount of TMA would reduce the dielectric loss of the thin film without affecting the dielectric constant of the thin film. In other words, introducing the TMA monomer to the LCP thin film may make the LCP thin film have excellent signal transmission rate and lower signal loss, such that the LCP thin film can be applied in flexible copper clad laminate (FCCL) for 4G/5G high frequency transmission.

The commercial available thin films CT-Z and CT-F and the prepared LCP thin films (from the polymer of Comparative Example 1, the polymer of Example 2, and the polymer of Example 2 with further thermal treatment) were treated by plasma and then laminated to a copper foil HA. The lamination factor was described below: The lamination is performed at the temperature shown in Table 5 for 30 minutes by a lamination pressure of 40 kgf/cm². The products had planar appearance without any bubble. The adhesion strength between the copper foil and the thin film in each of the products was then measured utilizing the standard IPC-TM-650 2.4.8.

As shown in Table 5, the polymer thin film formed by adding an appropriate amount of TMA could dramatically increase the adhesion strength between the thin film and the copper foil. The polymer thin film formed without TMA (Comparative Example 1) and the copper foil had an adhesion strength similar to that of the commercially available films and the copper foil.

On the other hand, the flexible copper clad laminates (FCCL) formed by laminating the thin film of the polymer in Examples 1 (or Example 2) to the copper foil were further laminated to dry film photoresist at 100° C. The dry film photoresist was exposed by a photomask, and then developed in an aqueous solution of 1% Na₂CO₃. The copper foil was etched at 60 to form a copper line with a line width of 50 μm, and no residue copper was occurred at the etching location. No abnormal phenomenon (e.g. delamination of the copper foil and the polymer thin film) was discovered on the FCCL after the lithography and etching processes.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A thin film, comprising:
   a polymer formed by reacting (a) p-hydroxybenzoic acid, (b) 6-hydroxy 2-naphthoic acid and (c) branched-monomer,
   wherein (c) branched-monomer is

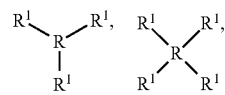

or a combination thereof, wherein R is aryl group, heteroaryl group, or cycloalkyl group, and each of $R^1$ is independently —OH, —NH₂, or —COOH;
   wherein a molar ratio of (a) p-hydroxybenzoic acid over (b) 6-hydroxy 2-naphthoic acid is between 50:50 and 90:10;
   wherein a molar ratio of (c) branched-monomer over the sum of (a) p-hydroxybenzoic acid and (b) 6-hydroxy 2-naphthoic acid is between 0.25:100 and 0.5:100; and
   wherein the polymer has an inherent viscosity of 4 dL/g to 6 dL/g.

2. The thin film as claimed in claim 1, wherein the molar ratio of (a) p-hydroxybenzoic acid over (b) 6-hydroxy 2-naphthoic acid is between 60:40 to 80:20.

TABLE 5

| | Kuraray CT-F | Polymer of Comparative Example 1 (TMA 0%) | Polymer of Example 2 (TMA 0.5 mol %) | Kuraray CT-Z | Polymer of Example 2 (TMA 0.5 mol %) (After thermal treatment) |
|---|---|---|---|---|---|
| Lamination temperature (° C.) | 270~280 | 270~280 | 270~280 | 300 | 300 |
| Adhesion strength (lb/in) | 7 | 7.5 | 22 | 8 | 29.92 |

3. The thin film as claimed in claim 1, wherein the molar ratio of (a) p-hydroxybenzoic acid over (b) 6-hydroxy 2-naphthoic acid is between 70:30 to 80:20.

4. The thin film as claimed in claim 1, wherein (c) branched-monomer is trimesic acid.

5. The thin film as claimed in claim 1, having a melt strength of 1.4 cN to 1.9 cN.

6. The thin film as claimed in claim 1, having an elongation ratio of 13% to 25%.

7. The thin film as claimed in claim 1, having a breaking strength of about 8 kgf/mm² to 10 kgf/mm².

8. A method for manufacturing a thin film, comprising:
performing a polymerization of (a) p-hydroxybenzoic acid, (b) 6-hydroxy 2-naphthoic acid, and (c) branched-monomer;
melting the polymer to form a thin film; and
thermally treating the thin film,
wherein (c) branched-monomer is

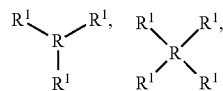

or a combination thereof, wherein R is aryl group, heteroaryl group, or cycloalkyl group, and each of R¹ is independently —OH, —NH₂, or —COOH;
wherein a molar ratio of (a) p-hydroxybenzoic acid over (b) 6-hydroxy 2-naphthoic acid is between 50:50 and 90:10;
wherein a molar ratio of (c) branched-monomer over the sum of (a) p-hydroxybenzoic acid and (b) 6-hydroxy 2-naphthoic acid is between 0.25:100 and 0.5:100; and
wherein the polymer has an inherent viscosity of 4 dL/g to 6 dL/g.

9. The method as claimed in claim 8, wherein the polymerization further includes anhydride compound, and anhydride groups of the anhydride compound and sum of (a) p-hydroxybenzoic acid and (b) 6-hydroxy 2-naphthoic acid have a molar ratio of 80:100 to 120:100.

10. The method as claimed in claim 8, wherein the polymerization is performed at a temperature of 280° C. to 330° C.

11. The method as claimed in claim 8, wherein the step of melting the polymer is performed at a temperature of 100° C. to 160° C.

12. The method as claimed in claim 8, wherein the step of thermally treating the thin film is performed at a temperature of 250° C. to 300° C.

13. A copper clad laminate, comprising:
a thin film; and
a copper foil attached to the thin film,
wherein the thin film comprises a polymer formed by reacting (a) p-hydroxybenzoic acid, (b) 6-hydroxy 2-naphthoic acid and (c) branched-monomer,
wherein (c) branched-monomer is

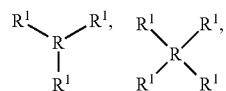

or a combination thereof, wherein R is aryl group, heteroaryl group, or cycloalkyl group, and each of R¹ is independently —OH, —NH₂, or —COOH;
wherein a molar ratio of (a) p-hydroxybenzoic acid over (b) 6-hydroxy 2-naphthoic acid is between 50:50 and 90:10;
wherein a molar ratio of (c) branched-monomer over the sum of (a) p-hydroxybenzoic acid and (b) 6-hydroxy 2-naphthoic acid is between 0.25:100 and 0.5:100; and
wherein the polymer has an inherent viscosity of 4 dL/g to 6 dL/g.

14. The copper clad laminate as claimed in claim 13, wherein (c) branched-monomer is trimesic acid.

* * * * *